United States Patent
Kittleson et al.

(10) Patent No.: US 8,667,856 B2
(45) Date of Patent: Mar. 11, 2014

(54) SENSOR ASSEMBLIES AND METHODS OF ASSEMBLING SAME

(75) Inventors: Jacob John Kittleson, Saint Ansgar, IA (US); Shankar Chandrasekaran, Bangalore (IN); Munish Vishwas Inamdar, Bangalore (IN)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 13/112,187

(22) Filed: May 20, 2011

(65) Prior Publication Data

US 2012/0291570 A1 Nov. 22, 2012

(51) Int. Cl.
- G01D 21/00 (2006.01)
- G01D 7/02 (2006.01)
- B25B 11/00 (2006.01)

(52) U.S. Cl.
USPC ....... 73/866.5; 73/431; 223/109 A; 248/205.1

(58) Field of Classification Search
USPC .................. 73/866.3, 866.5, 431; 248/205.1; 223/109 A
See application file for complete search history.

(56) References Cited

U.S. PATENT DOCUMENTS

| | | | |
|---|---|---|---|
| 2,405,655 A * | 8/1946 | Kehoe | 294/65.5 |
| 4,754,532 A * | 7/1988 | Thomson et al. | 24/303 |
| 5,196,818 A * | 3/1993 | Anderson | 335/285 |
| 5,623,769 A * | 4/1997 | Hayden | 34/61 |
| 5,629,577 A | 5/1997 | Polla et al. | |
| 5,642,089 A * | 6/1997 | Lysen | 335/285 |
| 5,895,018 A * | 4/1999 | Rielo | 248/206.5 |
| 6,279,885 B1 * | 8/2001 | Leon, Jr. | 269/8 |
| 6,427,336 B1 * | 8/2002 | Kojima et al. | 30/180 |
| 6,534,979 B1 * | 3/2003 | Wineland | 324/262 |
| 6,592,043 B1 | 7/2003 | Britton | |
| 6,964,209 B2 * | 11/2005 | Robinson et al. | 73/866.5 |
| 6,994,305 B2 * | 2/2006 | Schenk, Jr. | 248/205.1 |
| 7,004,957 B1 | 2/2006 | Dampney et al. | |
| 7,009,384 B2 * | 3/2006 | Heremans et al. | 324/165 |
| 7,061,371 B2 * | 6/2006 | Shockley | 340/425.1 |
| 7,075,296 B2 | 7/2006 | Moore | |
| 7,583,085 B2 * | 9/2009 | Hall et al. | 324/338 |
| 7,623,322 B2 * | 11/2009 | Umehara et al. | 360/317 |
| 7,909,521 B2 * | 3/2011 | Son | 396/428 |
| 2009/0165540 A1 | 7/2009 | Craig | |
| 2010/0043576 A1 | 2/2010 | Craig | |
| 2012/0019235 A1 * | 1/2012 | Post | 324/207.13 |

FOREIGN PATENT DOCUMENTS

| | | |
|---|---|---|
| DE | 3312987 A1 | 10/1984 |
| DE | 4126724 A1 | 2/1993 |
| DE | 19859952 A1 | 2/2000 |
| DE | 20307024 U1 | 7/2003 |

(Continued)

*Primary Examiner* — Randy W. Gibson
*Assistant Examiner* — Natalie Huls
(74) *Attorney, Agent, or Firm* — Armstrong Teasdale LLP

(57) ABSTRACT

A method for assembling a sensor assembly includes providing a sensing device configured to measure at least one variable. The method also includes at least partially enclosing a magnetic material within an enclosure. At least a portion of the enclosure is manufactured from a material having a permeability that facilitates forming a magnetic field therein. The method also includes coupling the sensing device to a first portion of the enclosure. The enclosure includes at least one second portion that is movable with respect to the first portion of the enclosure such that a magnetic coupling force is induced external to the enclosure to facilitate coupling the sensor assembly to a magnetic surface.

10 Claims, 22 Drawing Sheets

(56) References Cited

FOREIGN PATENT DOCUMENTS

| | | |
|---|---|---|
| DE | 10255348 A1 | 11/2003 |
| DE | 202004006503 U1 | 8/2004 |
| DE | 202006003427 U1 | 8/2006 |
| EP | 0335126 A2 | 10/1989 |
| EP | 0432743 A1 | 6/1991 |
| EP | 1251164 A1 | 10/2002 |
| EP | 1747835 A1 | 1/2007 |
| JP | 56114612 A | 9/1981 |
| JP | 56135087 A2 | 10/1981 |
| JP | 57160362 A | 10/1982 |
| JP | 58146765 A | 9/1983 |
| JP | 1228743 A | 9/1989 |
| JP | 2084312 A | 3/1990 |
| JP | 2130772 A | 5/1990 |
| JP | 02179364 A2 | 12/1990 |
| JP | 03113785 A2 | 5/1991 |
| JP | 03172605 A2 | 7/1991 |
| JP | 04203510 A2 | 7/1992 |
| JP | 4294116 A | 10/1992 |
| JP | 04041214 A2 | 12/1992 |
| JP | 5026965 A | 2/1993 |
| JP | 5083852 A | 4/1993 |
| JP | 5084765 A | 4/1993 |
| JP | 5192855 A | 8/1993 |
| JP | 05169454 A2 | 9/1993 |
| JP | 5277585 A | 10/1993 |
| JP | 6165511 A | 6/1994 |
| JP | 06226705 A2 | 8/1994 |
| JP | 07156032 A2 | 6/1995 |
| JP | 08326726 A2 | 10/1996 |
| JP | 08303477 A2 | 11/1996 |
| JP | 9047805 A | 2/1997 |
| JP | 09089904 A2 | 4/1997 |
| JP | 9310343 A | 12/1997 |
| JP | 11320204 A | 11/1999 |
| JP | 2000176763 A | 6/2000 |
| JP | 2001162472 A | 6/2001 |
| JP | 2002260711 A | 9/2002 |
| JP | 2004140202 A | 5/2004 |
| JP | 2004195855 A | 7/2004 |
| JP | 2005285307 A | 10/2005 |
| JP | 2005320749 A | 11/2005 |
| JP | 2005326357 A | 11/2005 |
| JP | 2007296987 A | 11/2007 |
| JP | 2008184871 A | 8/2008 |
| JP | 2009139199 A | 6/2009 |
| WO | 9325991 | 12/1993 |
| WO | 9529427 | 11/1995 |
| WO | 2007017692 A1 | 2/2007 |
| WO | 2009076942 A1 | 6/2009 |
| WO | 2009109288 A2 | 9/2009 |

\* cited by examiner

SENSOR ASSEMBLIES AND METHODS OF ASSEMBLING SAME

BACKGROUND OF THE INVENTION

The field of the invention relates generally to sensor assemblies and, more particularly, to sensor assemblies used with turbomachines.

At least some known turbomachines, such as turbine engines, include at least one component that may become damaged or worn over time. For example, known turbine engines include rotatable components, such as compressor blades and turbine buckets that may exhibit corrosion on the surfaces of the components or stress-related cracking. Moreover, many known turbomachines include stationary components, such as compressor stator vanes and turbine diaphragms that are interspersed with the rotatable compressor blades and turbine buckets, respectively. Continued operation with worn blades, buckets, vanes, and diaphragms may cause additional damage to such components and/or may cause damage of adjacent or downstream components. As such, routine assessments and/or inspections of rotatable and stationary components of a turbine engine are necessary, including visual inspections.

Many known visual inspection methods require at least partial disassembly of the turbomachine such that the rotatable components are removed from the turbomachine to facilitate visual inspections of the stationary components. Such disassembly increases the costs of the inspections and increases a time that the turbomachine is removed from service. Moreover, the stationary portions of the turbomachines are closely spaced and have intricate configurations that may increase the time and cost to perform a consistent and reliable inspection. As such, visual inspections of stationary components may require further disassembly, increased inspection resources, and specialized technological skills and equipment.

BRIEF SUMMARY OF THE INVENTION

In one aspect, A method for assembling a sensor assembly is provided. The method includes providing a sensing device configured to measure at least one variable. The method also includes at least partially enclosing a magnetic material within an enclosure. At least a portion of the enclosure is manufactured from a material having a permeability that facilitates forming a magnetic field therein. The method also includes coupling the sensing device to a first portion of the enclosure. The enclosure includes at least one second portion that is movable with respect to the first portion of the enclosure such that a magnetic coupling force is induced external to the enclosure to facilitate coupling the sensor assembly to a magnetic surface.

In a further aspect, a sensor assembly is provided. The sensor assembly includes a sensing device configured to measure at least one variable. The sensor assembly also includes at least one magnetic coupling device. The at least one magnetic coupling device includes at least one magnet and an enclosure at least partially manufactured from a material that has a permeability that facilitates forming a magnetic field therein. The enclosure includes a first portion coupled to the at least one magnet and at least one second portion that is movable with respect to the first portion such that a magnetic coupling force is induced external to the enclosure to facilitate coupling the sensor assembly to a magnetic surface.

In another aspect, a sensor assembly is provided. The sensor assembly includes a sensing device configured to measure at least one variable. The sensor assembly also includes at least one adhesive coupling device coupled to the sensing device. The at least one adhesive coupling device is configured to channel an adhesive material from the at least one adhesive coupling device to a surface.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
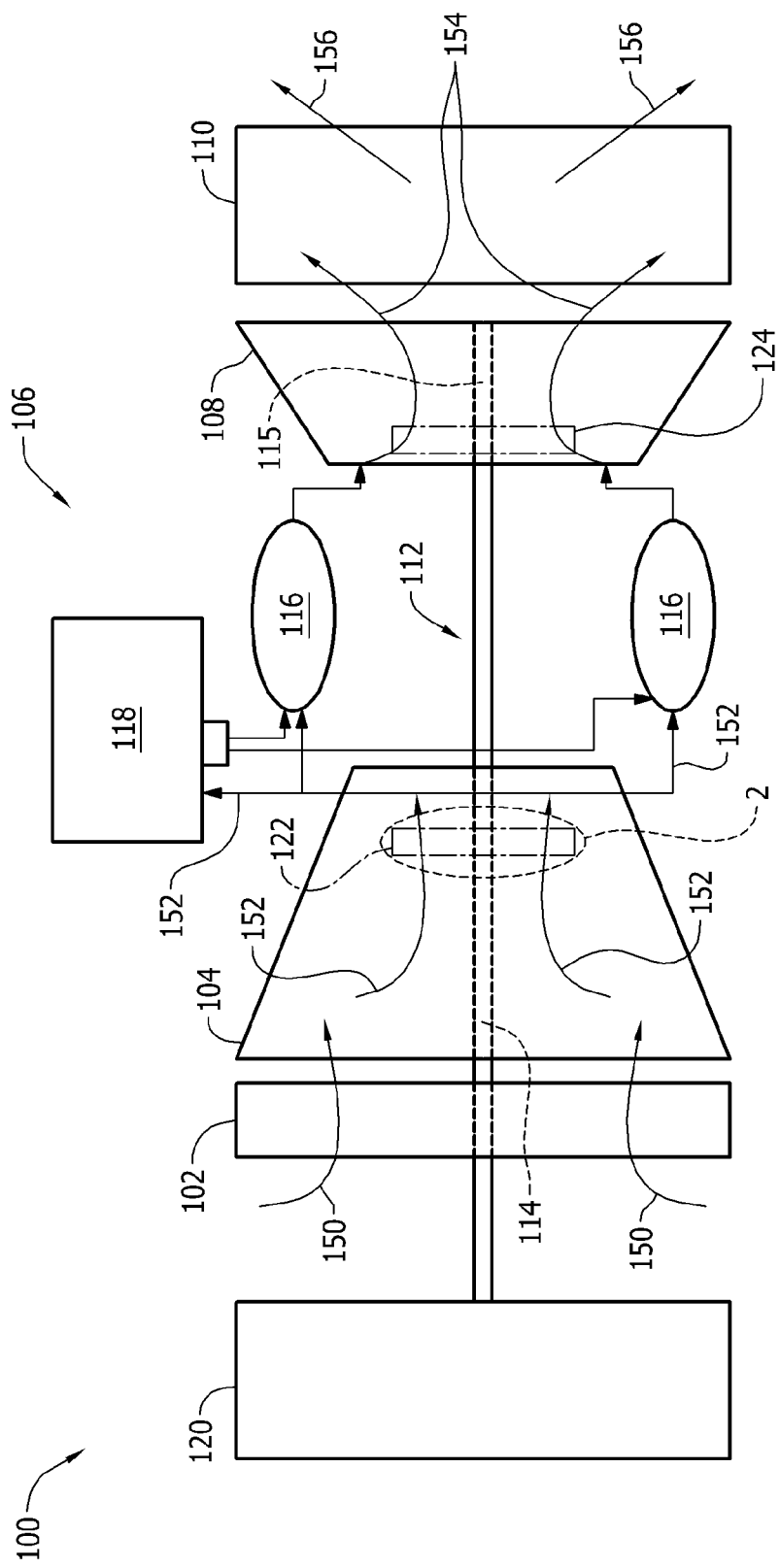
FIG. 1 is schematic diagram of an exemplary turbine engine.

FIG. 1 is a schematic view of a rotary machine 100, i.e., a turbomachine, and more specifically, a turbine engine. In the exemplary embodiment, turbine engine 100 is a gas turbine engine. Alternatively, it should be noted that those skilled in the art will understand that other engines and/or rotary machines, may be used. In the exemplary embodiment, turbine engine 100 includes an air intake section 102, and a compressor section 104 that is coupled downstream from, and in flow communication with, intake section 102. A combustor section 106 is coupled downstream from, and in flow communication with, compressor section 104, and a turbine section 108 is coupled downstream from, and in flow communication with, combustor section 106. Turbine engine 100 includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are coupled each in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. In the exemplary embodiment, compressor section 104 includes at least one compressor blade assembly 122. Also, in the exemplary embodiment, turbine section 108 includes at least one turbine blade or bucket mechanism 124. Each compressor blade assembly 122 and each turbine bucket mechanism 124 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is mixed with fuel (not shown) and ignited within section 106 to generate combustion gases 154 that are channeled downstream towards turbine section 108. Specifically, at least a portion of compressed air 152 is channeled to fuel nozzle assembly 118. Fuel is also channeled to fuel nozzle assembly 118, wherein the fuel is mixed with compressed air 152 and the mixture is ignited within combustors 116. Combustion gases 154 generated within combustors 116 are channeled downstream towards turbine section 108. After impinging turbine bucket mechanisms 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
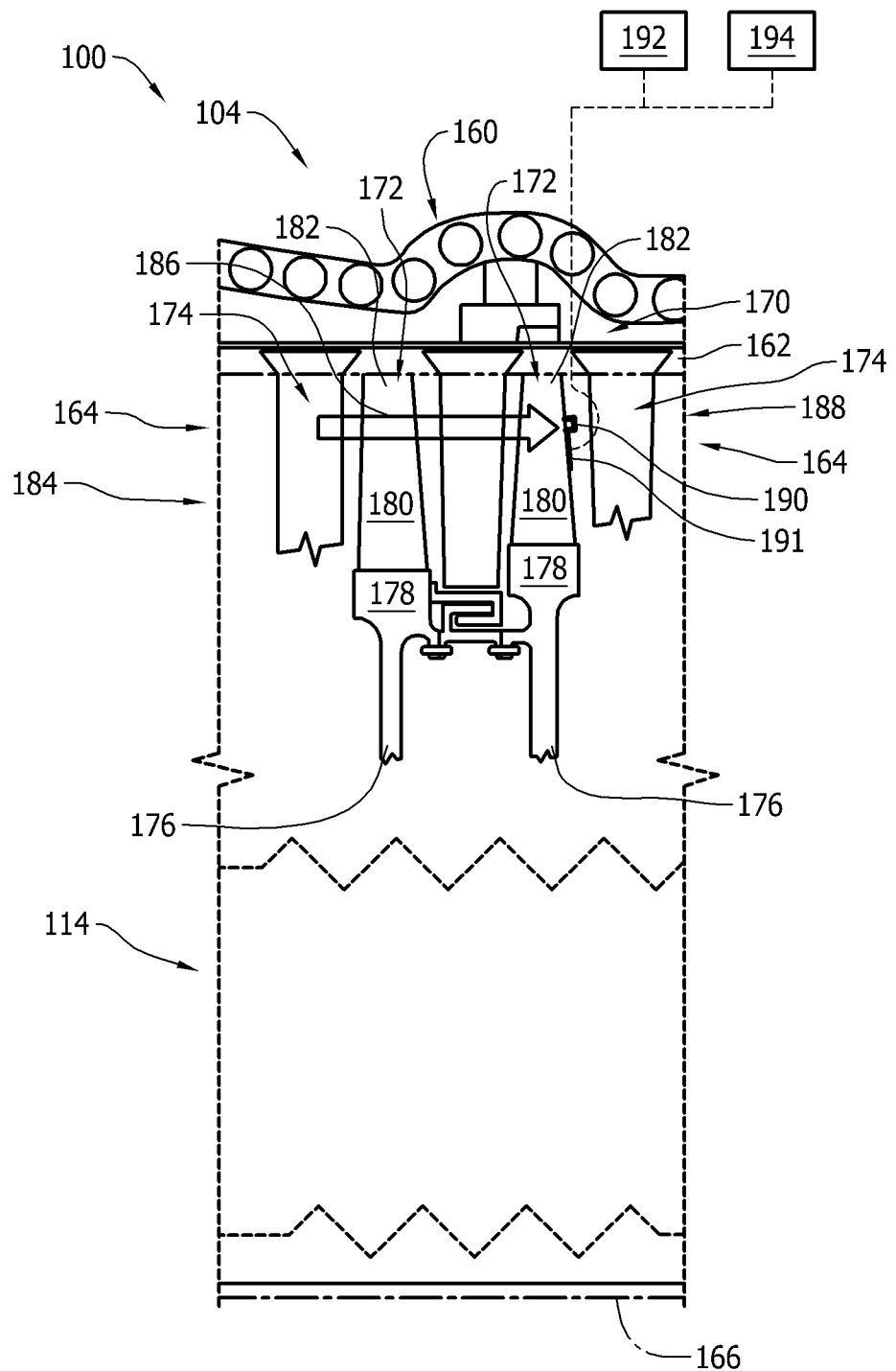
FIG. 2 is an enlarged cross-sectional view of a portion of a compressor that may be used with the gas turbine engine shown in FIG. 1 and taken along area 2.

FIG. 2 is an enlarged cross-sectional view of a portion of compressor section 104 used with gas turbine engine 100 and taken along area 2 (shown in FIG. 1). Compressor 104 includes compressor drive shaft 114 and a stationary portion, or more specifically, a compressor stator assembly 160 that are positioned within a compressor casing 162 that at least partially defines a flow path 164. In the exemplary embodiment, compressor drive shaft 114 forms a portion of rotor assembly 112 (shown in FIG. 1). Moreover, in the exemplary embodiment, compressor section 104 is oriented substantially symmetrically about a rotor axial centerline 166. Also, in the exemplary embodiment, compressor section 104 is a portion of turbine engine 100. Alternatively, compressor section 104 is any rotating, bladed, multi-stage fluid transport apparatus including, but not limited to, a stand-alone fluid compression unit or a fan.

Compressor section 104 includes a plurality of stages 170, wherein each stage 170 includes a row of circumferentially-spaced rotor blade assemblies 172 and a row of stator blade assemblies 174, sometimes referred to as stator vanes. In the exemplary embodiment, rotor blade assemblies 172 are coupled to a wheel portion, or more specifically, a compressor rotor disc or wheel 176 via an attachment mechanism 178 such that each rotor blade assembly 172 extends radially outwardly from compressor rotor wheel 176. Also, in the exemplary embodiment, a plurality of compressor rotor wheels 176 and a plurality of blade attachment mechanisms 178 at least partially define a generally convergent compressor hub (not shown). Moreover, each rotor blade assembly 172 includes a rotor blade airfoil portion 180 that extends radially outward from blade attachment mechanism 178 to a rotor blade tip portion 182. Compressor stages 170 cooperate with a motive or working fluid including, but not limited to, air, such that the motive fluid is compressed in succeeding stages 170.

In operation, compressor section 104 is rotated by turbine 108 (shown in FIG. 1) via compressor drive shaft 114. Fluid collected from a low pressure or compressor upstream region 184 via stages 170 is channeled by rotor blade airfoil portions 180 towards stator blade assemblies 174. The fluid is compressed and a pressure of the fluid is increased as the fluid is channeled through flow path 164 as indicated by a flow arrow 186. More specifically, the fluid continues to flow through subsequent stages 170 with flow path 164 generally narrowing with successive stages 170 to facilitate compressing and pressurizing the fluid as it is channeled through flow path 164. Compressed and pressurized fluid is subsequently channeled into a high pressure or compressor downstream region 188 for use within turbine engine 100.

In the exemplary embodiment, a sensor assembly 190 is positioned on at least one rotor blade airfoil portion 180 when compressor gas turbine engine 100 is removed from service. At least one sensing device 191 is coupled to sensor assembly 190. Sensing device 191 may include any sensing devices including, without limitation, miniature camera assemblies and temperature sensors. Sensing device 191 is communicatively coupled to at least one of a monitoring device 192 and/or a video recording device 194.

Figure 3:
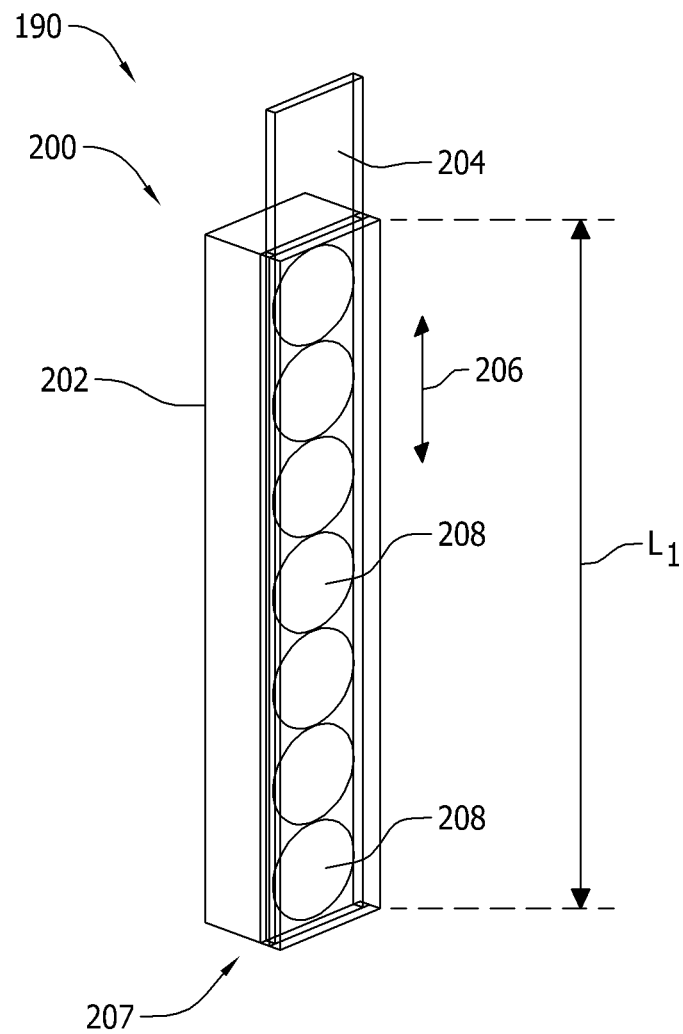
FIG. 3 is a schematic perspective view of an exemplary linear keeper clamping device with a keeper installed that may be used with the turbine engine shown in FIG. 1.

FIG. 3 is a schematic perspective view of an exemplary linear keeper clamping device 200 that may be used with sensor assembly 190 and turbine engine 100 (shown on FIG. 1). In the exemplary embodiment, linear keeper clamping device 200 is a magnetic coupling device. While linear keeper clamping device 200 may be used with turbine engine 100 as described herein, device 200 may be used with any rotary machine or any machine that includes regions and/or components that are difficult to visually observe during operation, and that includes any magnetic surface.

As used herein, the terms "high permeability", "highly permeable", and variations thereof are used in reference to properties of materials that facilitate formation of magnetic fields therein. Moreover, materials that have a high permeability include, without limitation, ferromagnetic materials such as iron. Also, as used herein, the term "low permeability" and variations thereof are used in reference to properties of materials that do not facilitate formation of magnetic fields therein. Moreover, materials that have a low permeability include, without limitation, stainless steel and non-ferrous materials such as aluminum and bronze.

In the exemplary embodiment, linear keeper clamping device 200 includes a casing 202 manufactured from any material that has a high magnetic permeability. Moreover, in the exemplary embodiment, linear keeper clamping device 200 also includes a slidable door or keeper 204 that is slidably coupled to casing 202. Keeper 204 is fabricated from a material having a high permeability that discourages magnetic fields (not shown in FIG. 3) from being induced to any significant degree external to linear keeper clamping device 200. Keeper 204 is slidable in the direction of bi-directional arrow 206 and is illustrated in FIG. 3 in the fully inserted position 207. Further, in the exemplary embodiment, linear keeper clamping device 200 includes a plurality of magnets 208. Moreover, in the exemplary embodiment, linear keeper clamping device 200 has a weight capacity of approximately 100 grams (3.5 ounces) and has a length $L_1$ between approximately 3.0 centimeters (cm) (1.2 inches (in.)) and approximately 3.5 cm (1.4 in.). Alternatively, linear keeper clamping device 200 may have any length $L_1$ and be designed to accommodate any weight that enables operation of linear keeper clamping device 200 as described herein.

Figure 4:
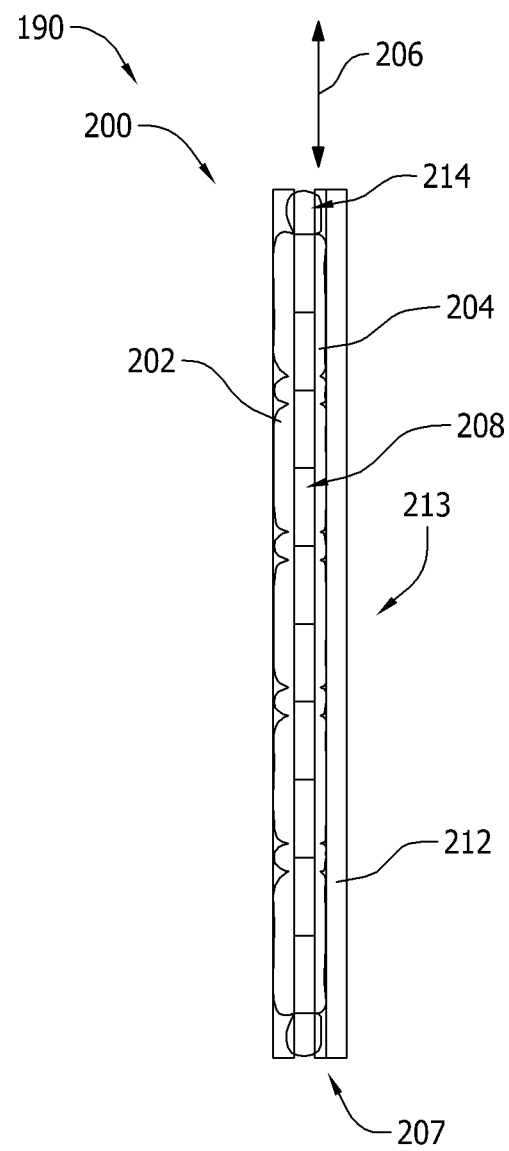
FIG. 4 is a schematic side view of the linear keeper clamping device shown in FIG. 3.

FIG. 4 is a schematic side view of linear keeper clamping device 200. Magnets 208 are coupled to casing 202 such that magnets 208 remain stationary during transit of device 200. Casing 202 is manufactured from a material with a high permeability. Linear keeper clamping device 200 also includes a member 212 that is coupled to casing 202. In the exemplary embodiment, member 212 is manufactured from a material that has a low permeability and that has a sufficient material strength to facilitate structural support of device 200, such as, for example, without limitation, a brass material. Linear keeper clamping device 200 includes an attachment side 213 that faces the surface (not shown) to which device 200 is to be coupled. When keeper 204 is in fully inserted position 207, the high permeability feature of keeper 204 substantially constrains a magnetic field 214 to keeper 204 and casing 202, thereby significantly reducing any portions of magnetic field 214 exiting device 200.

Figure 5:
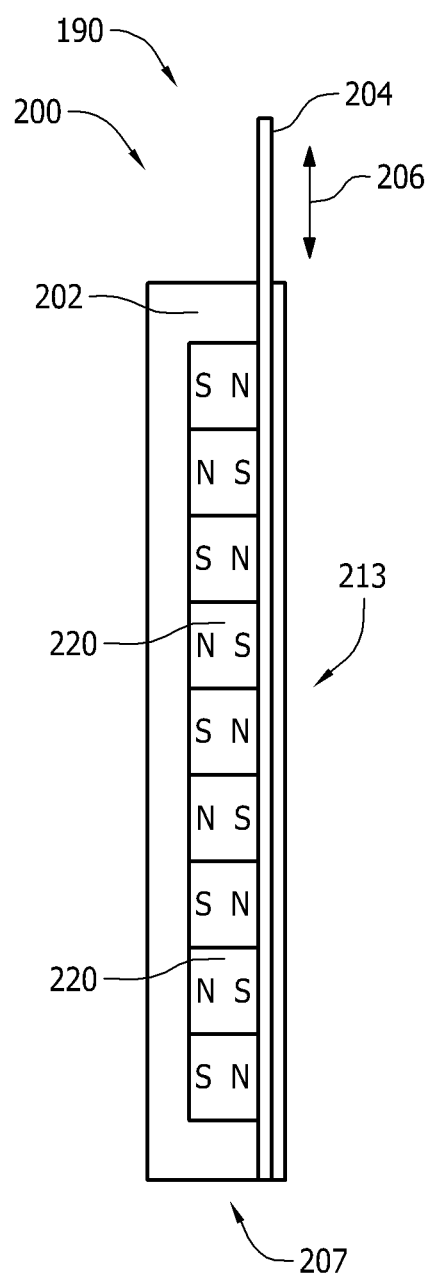
FIG. 5 is a schematic side view of the linear keeper clamping device shown in FIG. 4 with a plurality of alternating magnets shown.
Figure 6:
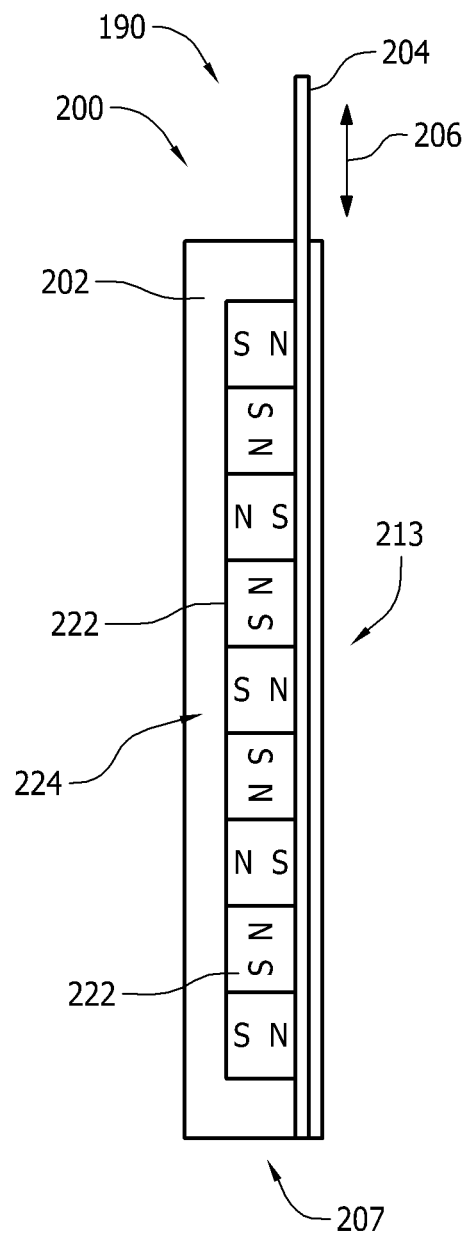
FIG. 6 is a schematic side view of the linear keeper clamping device shown in FIG. 4 with a plurality of Halbach array magnets shown.

FIG. 5 is a schematic side view of linear keeper clamping device 200 in one embodiment in which magnets 208 (shown in FIGS. 3-4) are a plurality of alternating magnets 220. FIG. 6 is a schematic side view of linear keeper clamping device 200 in which magnets 220 are oriented in a Halbach array 224. More specifically, in Halbach array 224, magnets 222 are each oriented in a predetermined position that facilitates generating a predetermined distributed magnetic field (not shown in FIG. 6). In general, Halbach arrays, such as array 224, facilitate generating predetermined magnetic flux patterns that are oriented in substantially one direction, wherein the flux patterns are typically stronger than those attained using other magnets, for example, alternating magnets 220 (shown in FIG. 5). Alternatively, any other arrangement and orientation of magnets that enables magnetic flux lines to be oriented along substantially one direction are used. Also, alternatively, any arrangement and orientation of magnets that enables operation of linear keeper clamping device 200 as described herein may be used.

Figure 7:
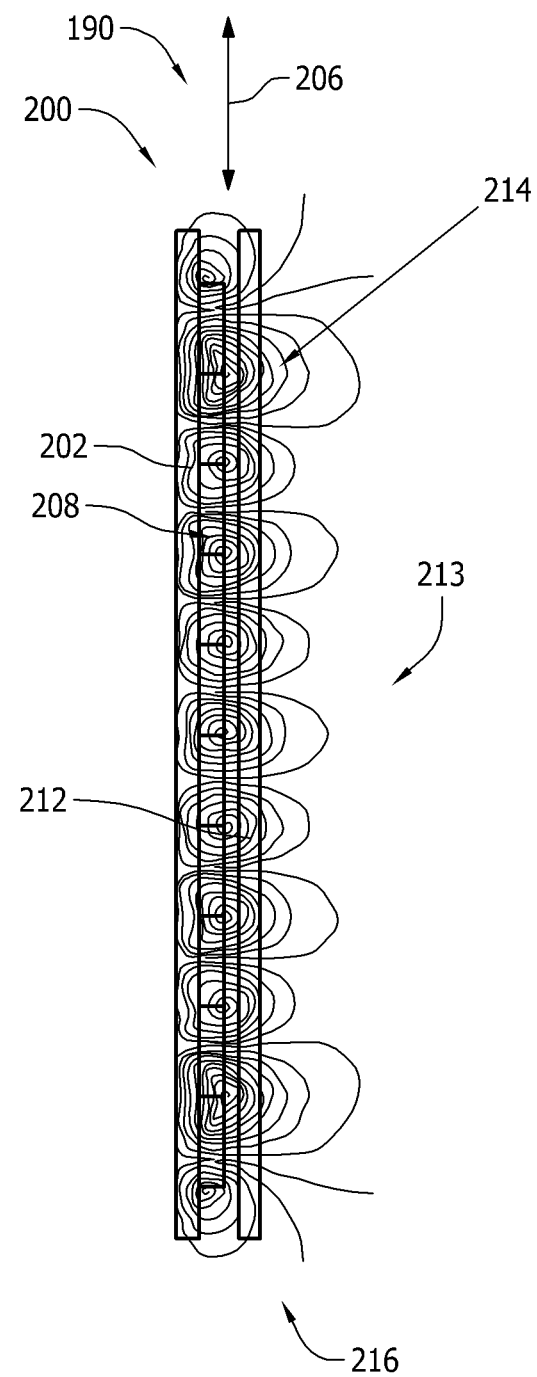
FIG. 7 is a schematic side view of the linear keeper clamping device shown in FIG. 3 with the keeper removed.

FIG. 7 is a schematic side view of linear keeper clamping device 200 with keeper 204 (shown in FIGS. 3-6) in a fully retracted position 216 and with magnetic field 214 shown. When keeper 204 is in fully retracted position 216, the high permeability of keeper 204 is removed and thus magnetic field 214 is no longer constrained to keeper 204. Rather, magnetic field 214 extends through member 212 with the low permeability as described above. As such, portions of magnetic field 214 are extended beyond device 200 to enable coupling attachment side 213 to a surface, such as, for example, without limitation, a surface of rotor blade airfoil portion 180 (shown in FIG. 2).

Figure 8:
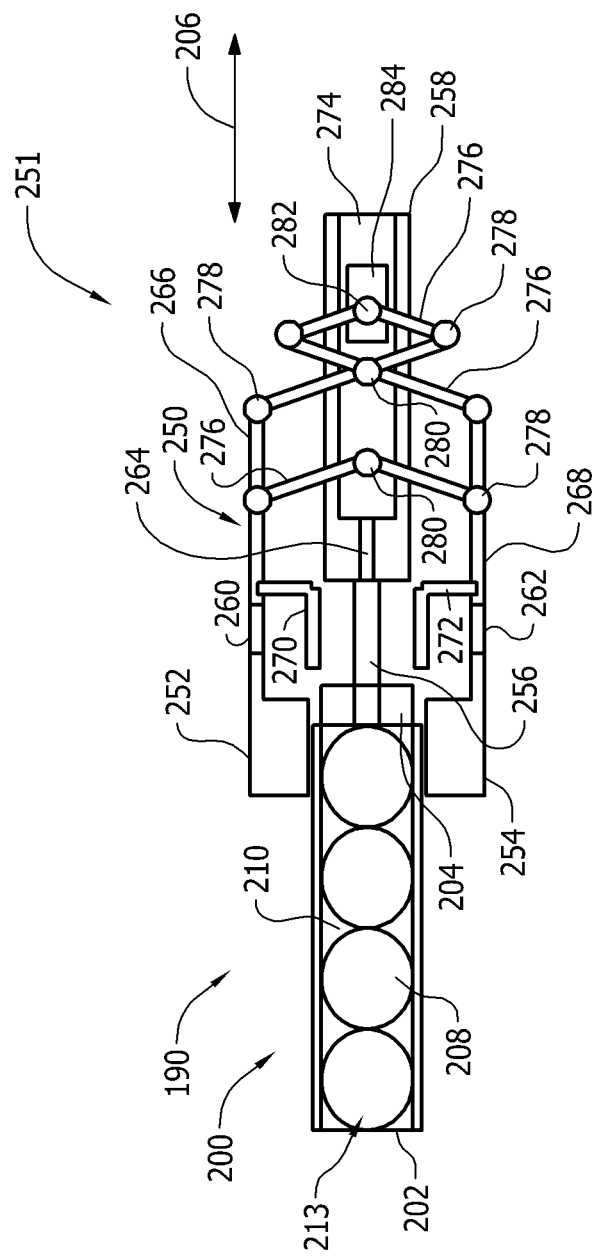
FIG. 8 is a schematic side view of an exemplary actuation jaw assembly, that may be used with the linear keeper clamping device shown in FIG. 3, in an open position.

FIG. 8 is a schematic side view of an exemplary actuation jaw assembly 250 in an open position 251. For clarity, member 212 is illustrated as hidden. In the exemplary embodiment, actuation jaw assembly 250 includes a first jaw clamp 252 and a second jaw clamp 254 that is positioned opposite first jaw clamp 252. In open position 251, first jaw clamp 252 and second jaw clamp 254 do not touch casing 202. Actuation jaw assembly 250 also includes a constraining member 256 coupled to casing 202. Actuation jaw assembly 250 further includes an enclosure body 258 that is coupled to constraining member 256. Actuation jaw assembly 250 also includes a first biasing device 260 coupled to first jaw clamp 252, a second biasing device 262 coupled to second jaw clamp 254, and a third biasing device 264 positioned within enclosure body 258 and coupled to constraining member 256. First biasing device 260, second biasing device 262, and third biasing device 264 may be any biasing device that enables operation of actuation jaw assembly 250 as described herein including, without limitation, double-acting blade springs, bistable blade springs, and standard tension springs. In the exemplary embodiment, actuation jaw assembly 250 induces sufficient force to overcome frictional forces between casing 202 and keeper 204.

Also, in the exemplary embodiment, actuation jaw assembly 250 includes a first member 266 coupled to first biasing device 260 and a second member 268 coupled to second biasing device 262. Actuation jaw assembly 250 also includes a third jaw clamp 270 coupled to first member 266, and a fourth jaw clamp 272 coupled to second member 268. First and second members 266 and 268 are substantially rigid to facilitate constraining vertical motion of jaw clamps 252, 254, 270, and 272 in a direction perpendicular to arrow 206.

Further, in the exemplary embodiment, actuation jaw assembly 250 includes a pin constraint 274 that is slidably coupled to enclosure body 258. Pin constraint 274 is also coupled to third biasing device 264. Actuation jaw assembly 250 also includes a plurality of pivoting linkage members 276 that is coupled to a plurality of suspended linkage pivot pins 278. Pivoting linkage members 276 are also coupled to a plurality of anchored linkage pivot pins 280. At least one anchored linkage pivot pin 280 is an activating protrusion, e.g., a manual pull pin 282. Anchored linkage pivot pins 280 are coupled to pin constraint 274, and manual pull pin 282 is coupled to a pin anchor slide 284 that is coupled to pin constraint 274.

Figure 9:
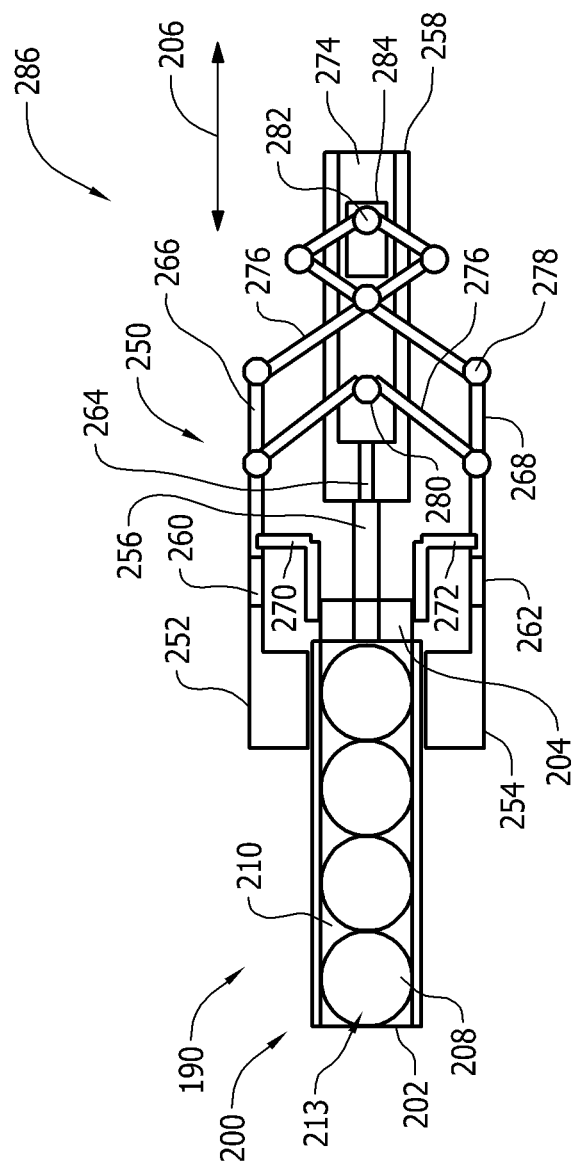
FIG. 9 is a schematic side view of the actuation jaw assembly shown in FIG. 8 in a grip position.

FIG. 9 is a schematic side view of actuation jaw assembly 250 in a grip position 286. In operation, as a force directed away from casing 202 that is substantially parallel to arrow 206, is applied to manual pull pin 282, manual pull pin 282 slides away from casing 202 and pivoting linkage members 276 pivot about suspended linkage pivot pins 278 and anchored linkage pivot pins 280 to induce at least some tension in first member 266 and second member 268. First biasing device 260, second biasing device 262, and third biasing device 264 elongate slightly. First jaw clamp 252 and second jaw clamp 254 shift toward casing 202 in a direction substantially parallel to arrow 206, and clamps 252 and 254 grip casing 202. Such gripping of casing 202 by clamps 252 and 254 facilitates decreasing movement of actuation jaw assembly 250 and casing 202 in a direction perpendicular to arrow 206. Third jaw clamp 270 and fourth jaw clamp 272 shift toward, and grip, keeper 204. Such gripping of keeper 204 by clamps 270 and 272 facilitates decreasing movement of actuation jaw assembly 250 and keeper 204 in a direction perpendicular to arrow 206. Actuation jaw assembly 250 is a longitudinally translatable device.

Figure 10:
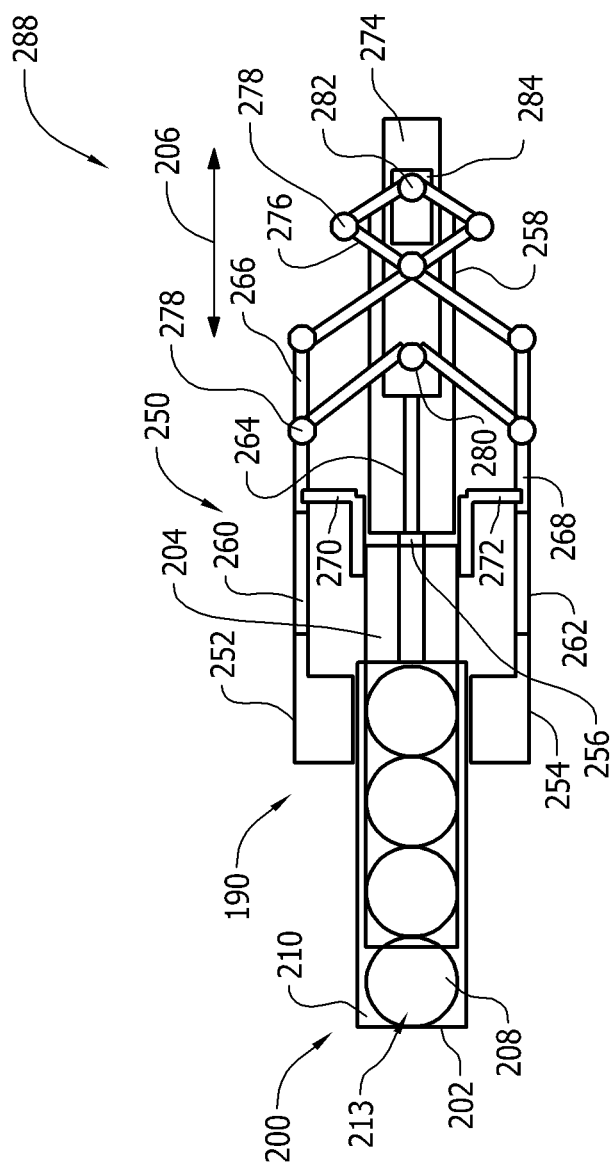
FIG. 10 is a schematic side view of the actuation jaw assembly shown in FIG. 8 in an actuation position.

FIG. 10 is a schematic side view of actuation jaw assembly 250 in an actuation position 288. In operation, a force directed away from casing 202 that is substantially parallel to arrow 206 continues to be applied to manual pull pin 282. Pivoting linkage members 276 further pivot about suspended linkage pivot pins 278 and anchored linkage pivot pins 280 to induce additional tension in first member 266 and second member 268. As first biasing device 260, second biasing device 262, and third biasing device 264 further elongate, they induce a predetermined force in actuation jaw assembly 250 that is directed toward casing 202 in a direction substantially parallel to arrow 206. First jaw clamp 252 and second jaw clamp 254 remain in gripping contact with casing 202, and thereby continue to substantially decrease movement of actuation jaw assembly 250 and casing 202 in a direction substantially perpendicular to arrow 206. Third jaw clamp 270 and fourth jaw clamp 272 remain in firm, gripping contact with keeper 204, thereby continuing to facilitate decreasing movement of actuation jaw assembly 250 and keeper 204 in a direction perpendicular to arrow 206.

As force continues to be applied to manual pull pin 282, pin constraint 274 slides away from enclosure body 258. Pin constraint 274 pulls pivoting linkage members 276, first member 266, and second member 268 away from casing 202, while continuing to elongate biasing devices 260, 262, and 264. First jaw clamp 252 and second jaw clamp 254 remain in firm, gripping contact with casing 202, and clamps 252 and 254 remain stationary. As biasing devices 260 and 262 elongate, third jaw clamp 270 and fourth jaw clamp 272 move away from casing 202, pulling keeper 204 in the same direction, thereby exposing magnets 208 and extending magnetic field 214 (shown in FIG. 7) beyond casing 202. Magnetic field 214 extends through member 212 (shown in FIG. 7) with the low permeability as described above, thereby significantly extending portions of magnetic field 214 beyond device 200 to facilitate coupling attachment side 213 to a surface (not shown in FIG. 10) for example, without limitation, a surface of rotor blade airfoil portion 180 (shown in FIG. 2).

In the exemplary embodiment, biasing devices 260, 262, and 264 and enclosure body 258 have sufficient lengths to facilitate fully extracting keeper 204 from casing 202 to expose all of magnets 208. Once biasing devices 260, 262, and 264 are fully extended, sufficient force to reinsert keeper 204 in casing 202 to cover magnets 208 is induced by the biases induced by biasing devices 260, 262, and 264.

Also, in the exemplary embodiment, linear keeper clamping device 200 is defined as "off" when keeper 204 is in fully inserted position 207 and magnets 208 are shielded and as "on" when keeper 204 is in fully retracted position 216 and magnets 208 are unshielded.

Figure 11:
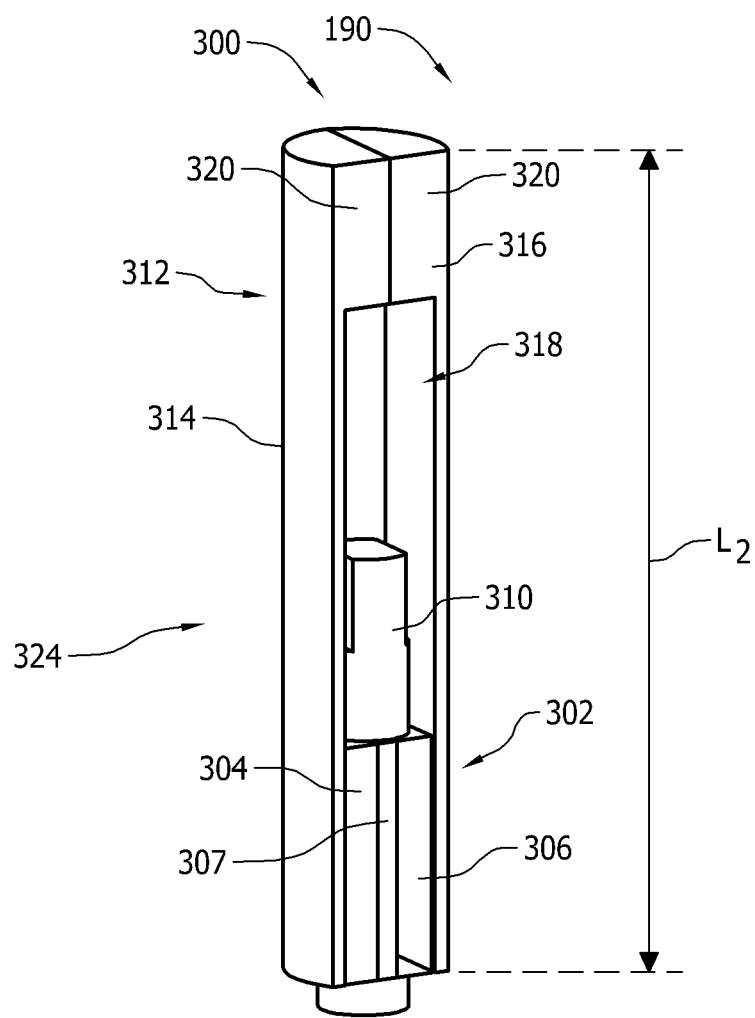
FIG. 11 is a schematic perspective view of an exemplary keeper clamp shield device with a shield closed that may be used with the turbine engine shown in FIG. 1.

FIG. 11 is a schematic perspective view of an exemplary keeper clamp shield device 300 that may be used with sensor assembly 190 and turbine engine 100 (shown on FIG. 1). In the exemplary embodiment, keeper clamp shield device 300 is a magnetic coupling device. While keeper clamp shield device 300 may be used with turbine engine 100 as described herein, device 300 may be used with any rotary machine or any machine that includes regions and/or components that are difficult to visually observe during operation, and that includes any magnetic surface.

Figure 12:
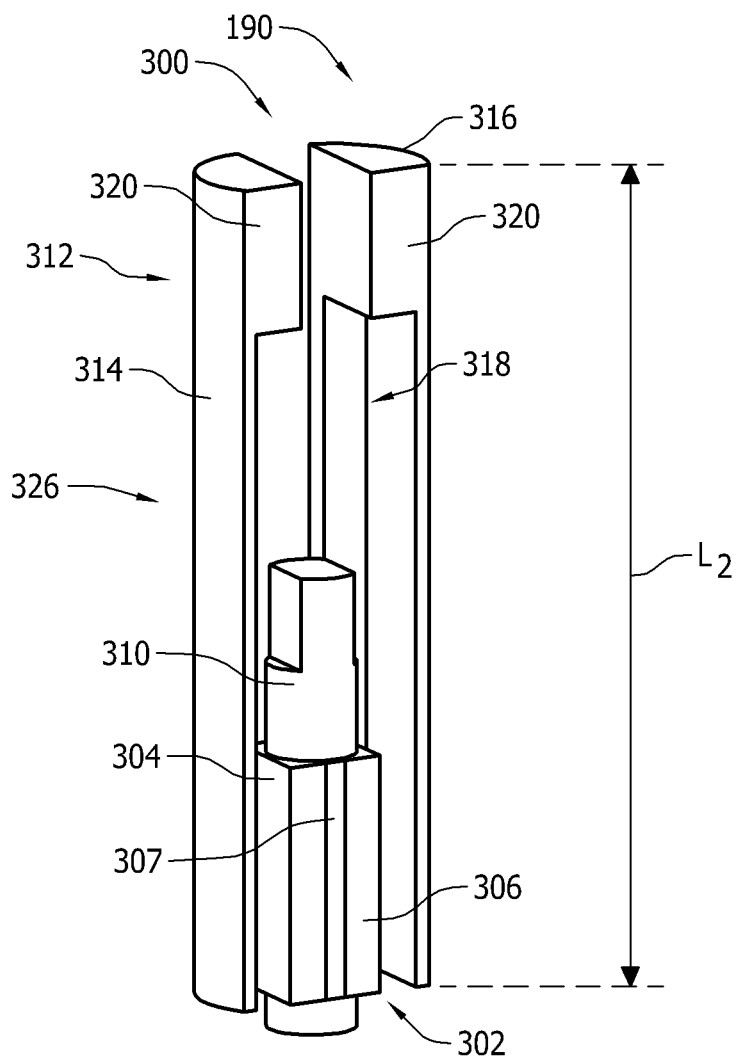
FIG. 12 is a schematic perspective view of the keeper clamp shield device shown in FIG. 11 with the shield open.
Figure 13:
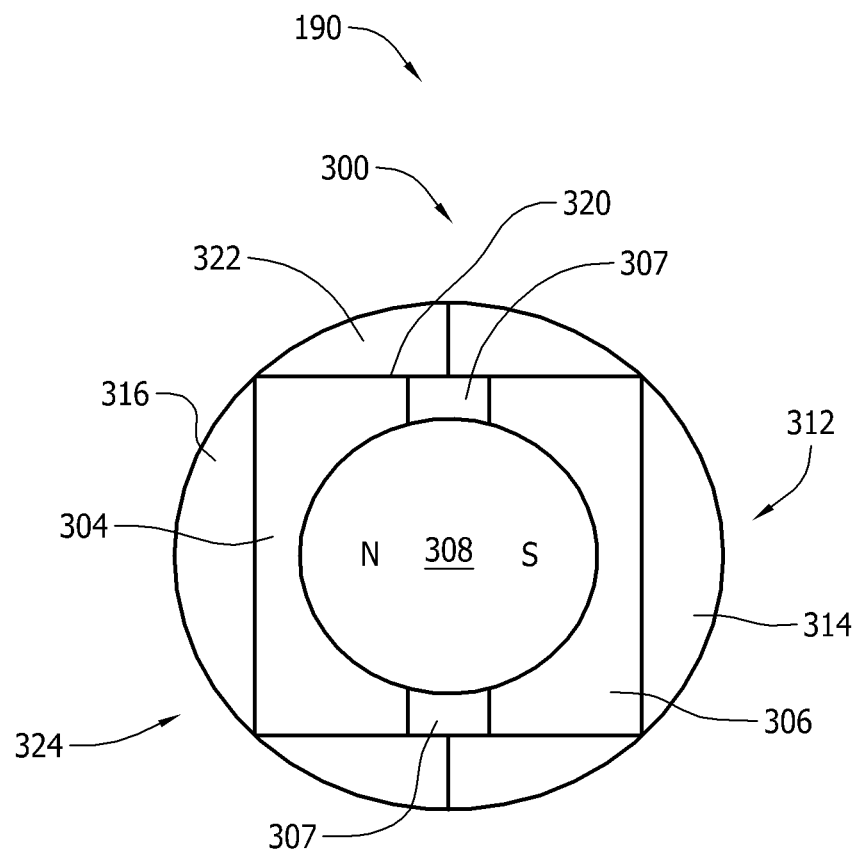
FIG. 13 is a schematic overhead view of the keeper clamp shield device shown in FIG. 11 with the shield closed.

FIG. 12 is a schematic perspective view of exemplary keeper clamp shield device 300. FIG. 13 is a schematic overhead view of keeper clamp shield device 300. Shield device 300 includes a magnetic keeper clamping device 302. Keeper clamping device 302 includes a first member 304, a second member 306, and a third member 307. First and second members 304 and 306 are manufactured from materials such as, for example, mild steel. Third member 307 is manufactured from materials, such as, for example, brass materials. Keeper clamping device 302 also includes a magnet 308 (only shown in FIG. 13) positioned between, and coupled to, at least one of members 304, 306, and 307 such that members 304, 306, and 307 facilitate maintaining magnet 308 therebetween during transit and operation of keeper clamp shield device 300. In the exemplary embodiment, magnet 308 is coupled to one of members 304, 306, and 307 via any mechanism that enables operation of device 300 as described herein including, without limitation, glue, brazing, and tack welding. Magnet 308 is similar to magnets 208 (shown in FIGS. 3-4 and 7-8). Keeper clamping device 302 also includes a sensing instrument attachment device 310 that facilitates manual handling of device 302. In the exemplary embodiment, keeper clamping device 302 is always "on", i.e., magnet 308 is unshielded and a magnetic field (not shown) is permitted to extend from keeper clamping device 302 which is contrary to linear keeper clamping device 200 (shown in FIGS. 3-8) that is "off" when keeper 204 (shown in FIGS. 3-6 and 8) is in fully inserted position 207 and "on" when keeper 204 is in fully refracted position 216.

Keeper clamp shield device 300 also includes a shield 312. Shield 312 includes a first portion 314 and a second portion 316. Shield 312 defines an instrument cavity 318 that facilitates positioning and maintaining a sensing instrument (not shown) within keeper clamp shield device 300 in cooperation with sensing instrument attachment device. In the exemplary embodiment, shield 312 is manufactured from any material that has a high magnetic permeability for example, without limitation, electric steel, Permalloy, and Mu-metal.

Also, in the exemplary embodiment, keeper clamp shield device 300 has a weight capacity of approximately 100 grams (3.5 ounces) and has a length $L_2$ between approximately 4.0 cm (1.6 in.) and approximately 5.0 cm (2.0 in.). Alternatively, keeper clamp shield device 300 is extendably scalable to any length $L_2$ and be designed to accommodate any weight that enables operation of keeper clamp shield device 300 as described herein.

FIG. 11 and FIG. 13 show shield 312 in a closed position 324, or keeper clamp shield device 300 in an "off" condition, wherein a significant portion of a magnetic flux (not shown in FIGS. 11 and 13) is channeled through shield 312 and a relatively weak magnetic field is generated in the vicinity of flat face 320. Keeper clamp shield device 300 will likely not magnetically couple to magnetic surface 322 in this condition.

FIG. 12 shows shield 312 in an open position 326. Keeper clamp shield device 300 in an "on" condition, wherein a significant portion of a magnetic flux (not shown in FIG. 12) is no longer channeled through shield 312 and a relatively strong magnetic field is generated in the vicinity of flat face 320 due to the low magnetic permeability of air. Keeper clamp shield device 300 will magnetically couple to magnetic surface 322 (shown in FIG. 13) in this condition, wherein magnetic surface 322 includes, without limitation, a surface of rotor blade airfoil portion 180 (shown in FIG. 2). Keeper clamp shield device 300 is a laterally extendable, split-shield device.

Figure 14:
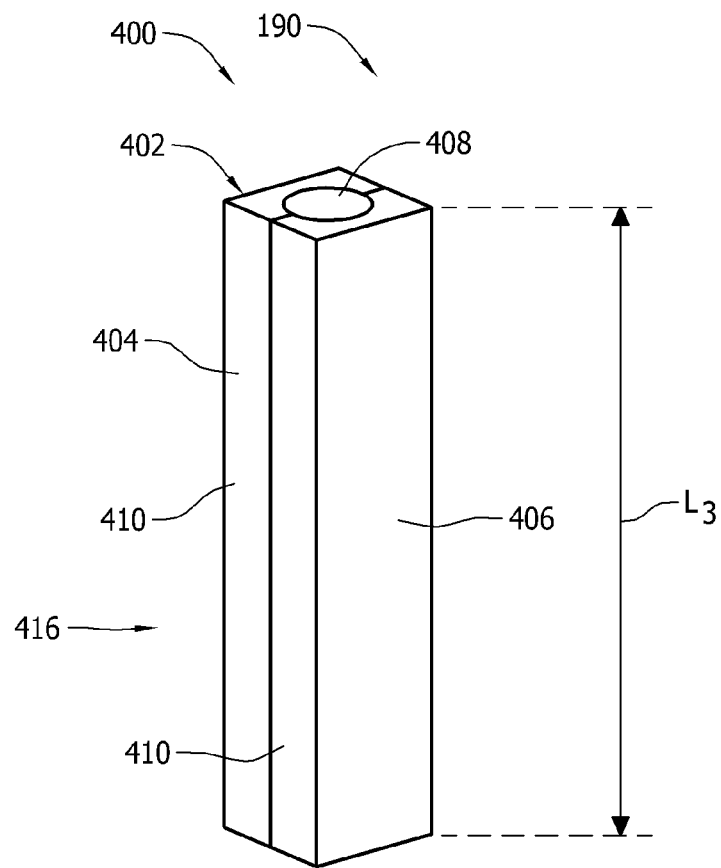
FIG. 14 is a schematic perspective view of an exemplary alternative keeper clamp shield device with a shield closed that may be used with the turbine engine shown in FIG. 1.

FIG. 14 is a schematic perspective view of an exemplary alternative keeper clamp shield device 400 that may be used with sensor assembly 190 and turbine engine 100 (shown on FIG. 1). In the exemplary embodiment, keeper clamp shield device 400 is a magnetic coupling device. While keeper clamp shield device 400 may be used with turbine engine 100 as described herein, device 400 may be used with any rotary machine or any machine that includes regions and/or components that are difficult to visually observe during operation, and that includes any magnetic surface.

Figure 15:
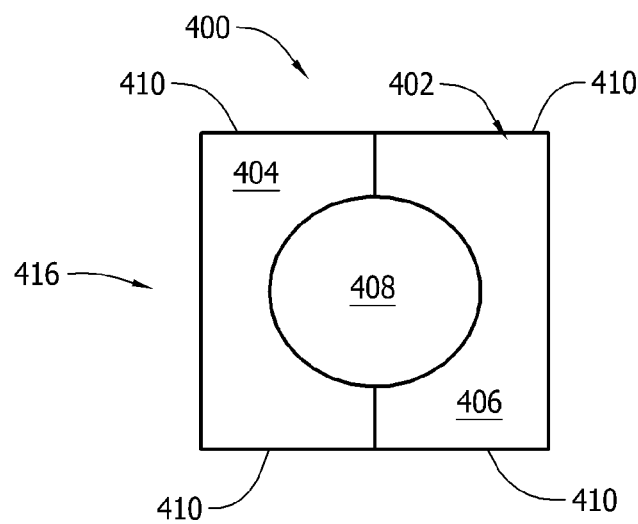
FIG. 15 is a schematic overhead view of the keeper clamp shield device shown in FIG. 14 with the shield closed.
Figure 16:
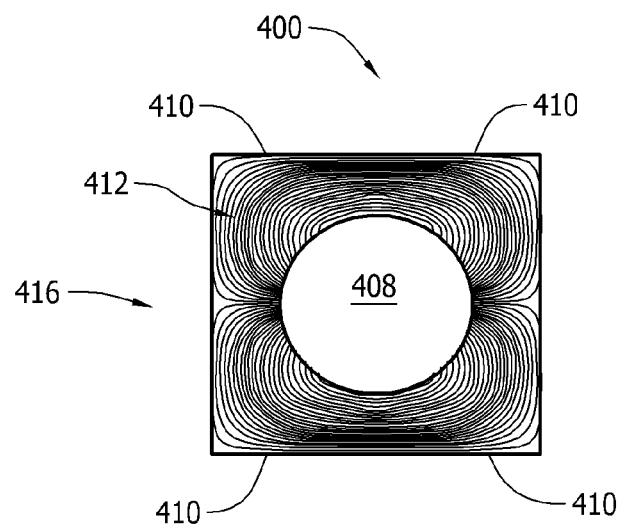
FIG. 16 is a schematic overhead view of the keeper clamp shield device shown in FIG. 14 with a magnetic field shown.

FIG. 15 is a schematic overhead view of alternative keeper clamp shield device 400. FIG. 16 is a schematic overhead view of alternative keeper clamp shield device 400. Keeper clamp shield device 400 is similar to keeper clamp shield device 300 with the exception of shape as discussed further below.

Keeper clamp shield device 400 includes a substantially rectangular shield 402 that includes a first portion 404 and a second portion 406. Shield 402 houses a magnet 408 that is similar to magnets 208 (shown in FIGS. 3-4 and 7-8). In the exemplary embodiment, magnet 408 is coupled to one of members 404 and 406 via any mechanism that enables operation of device 400 as described herein including, without limitation, glue, brazing, and tack welding.

Shield 402 defines an instrument cavity (not shown) that facilitates positioning and maintaining a sensing instrument (not shown) within keeper clamp shield device 400. In the exemplary embodiment, shield 402 is manufactured from any material that has a high magnetic permeability for example, without limitation, electric steel, Permalloy, and Mu-metal.

Also, in the exemplary embodiment, keeper clamp shield device 400 has a weight capacity of approximately 100 grams (3.5 ounces) and has a length $L_3$ between approximately 1.0 cm (0.4 in.) to approximately 2.0 cm (0.8 in.). Alternatively, keeper clamp shield device 400 is extendably scalable to any length $L_3$ and to accommodate any weight that enables operation of keeper clamp shield device 400 as described herein. Further, in the exemplary embodiment, keeper clamp shield device 400 defines a plurality of flat coupling faces 410 that facilitate coupling device 400 to a magnetic surface (not shown), for example, a compressor blade.

FIGS. 14-16 show shield 402 in a closed position 416, therefore keeper clamp shield device 400 in an "off" condition, wherein a significant portion of a magnetic flux 412 (only shown in FIG. 16) is channeled through shield 402 and little of magnetic flux 412 exits device 400. Keeper clamp shield device 400 will likely not magnetically couple to a magnetic surface (not shown) in this condition. Keeper clamp shield device 400 is a laterally extendable, split-shield device.

Figure 17:
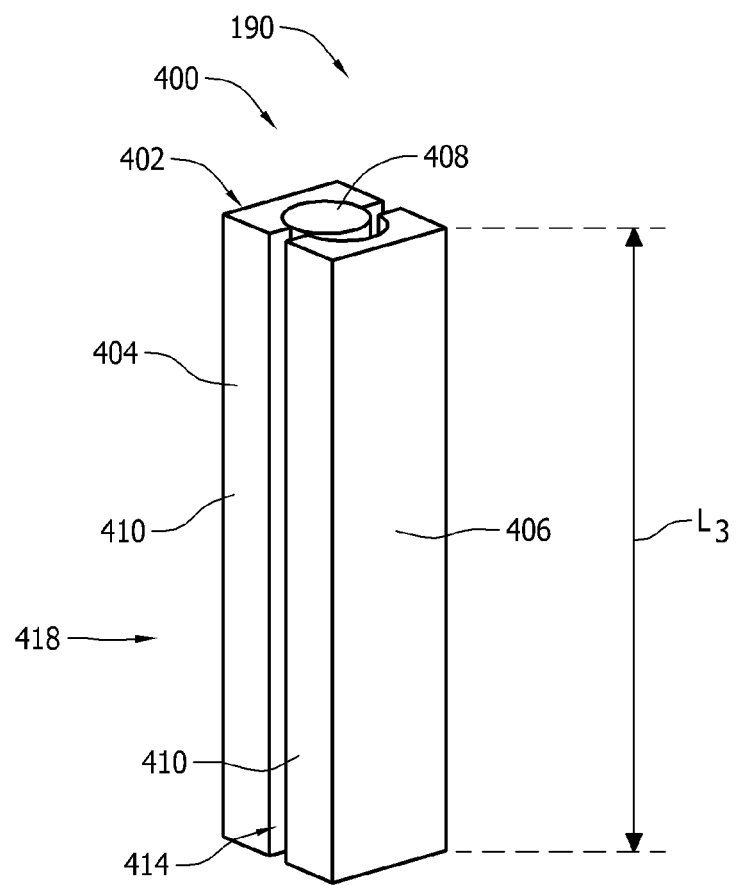
FIG. 17 is a schematic perspective view of the keeper clamp shield device shown in FIG. 14 with the shield open.
Figure 18:
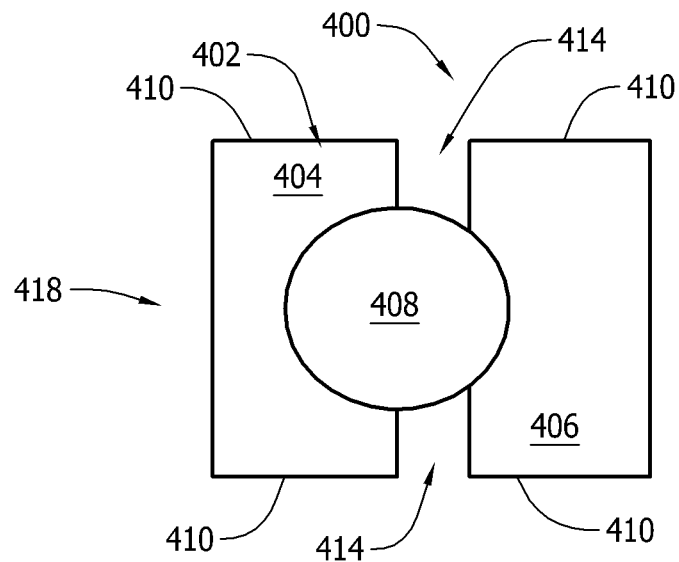
FIG. 18 is a schematic overhead view of the keeper clamp shield device shown in FIG. 14 with the shield open.
Figure 19:
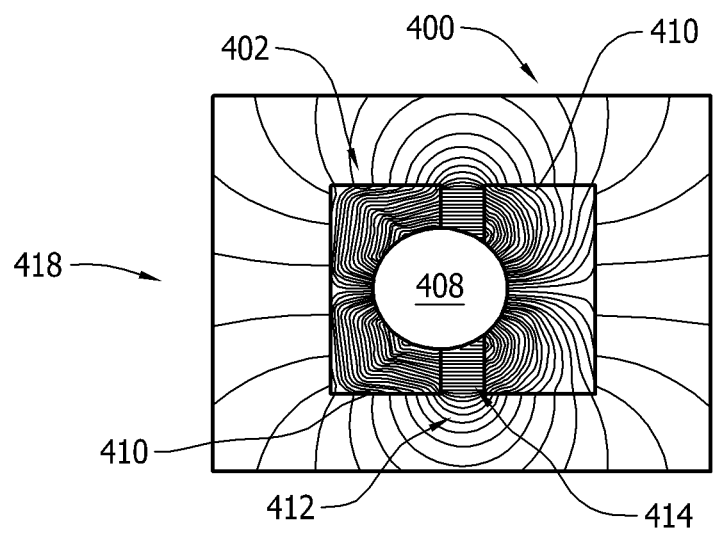
FIG. 19 is a schematic overhead view of the keeper clamp shield device shown in FIG. 14 with a magnetic field shown.

FIG. 17 is a schematic perspective view of exemplary alternative keeper clamp shield device 400. FIG. 18 is a schematic overhead view of alternative keeper clamp shield device 400. FIG. 19 is a schematic overhead view of alternative keeper clamp shield device 400.

FIGS. 17-19 show shield 402 in an open position 418, thereby defining a plurality of shield openings 414. Keeper clamp shield device 400 in an "on" condition, wherein a significant portion of magnetic flux 412 (only shown in FIG. 19) is channeled through shield openings 414 due to the low magnetic permeability of air. Keeper clamp shield device 400 will magnetically couple to a magnetic surface (not shown) in this condition via either of shield openings 414 and flat coupling surfaces 410, wherein the magnetic surface includes, without limitation, a surface of rotor blade airfoil portion 180 (shown in FIG. 2).

Figure 20:
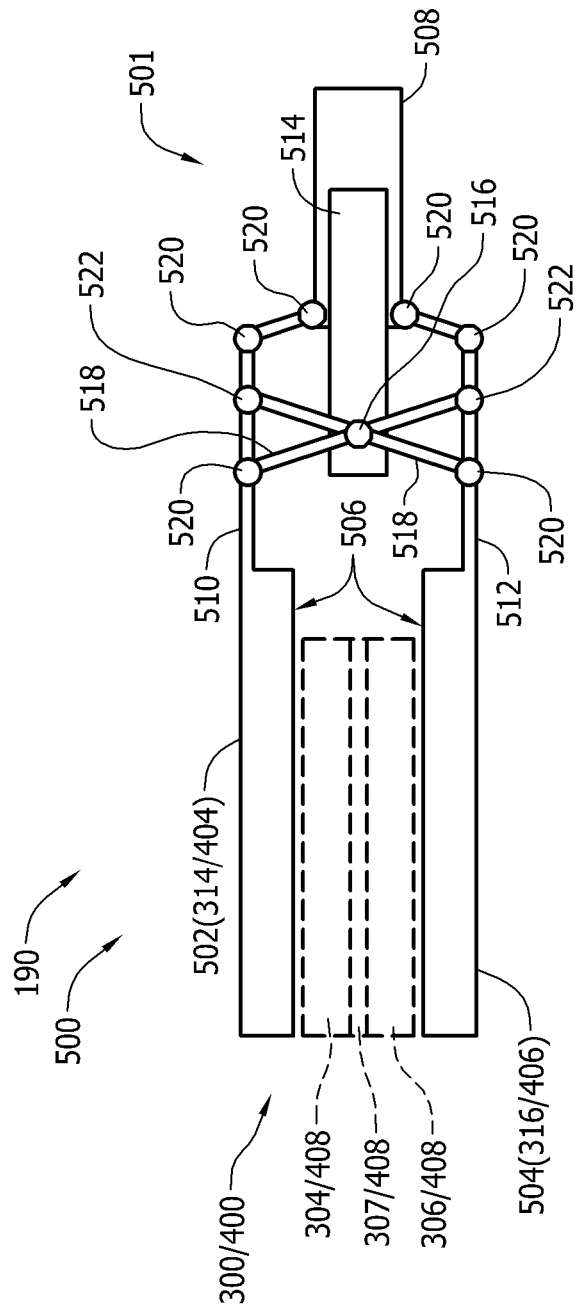
FIG. 20 is a schematic side view of an exemplary actuation jaw in a clamped position that may be used with the keeper clamp shield devices shown in FIGS. 11-19.
Figure 21:
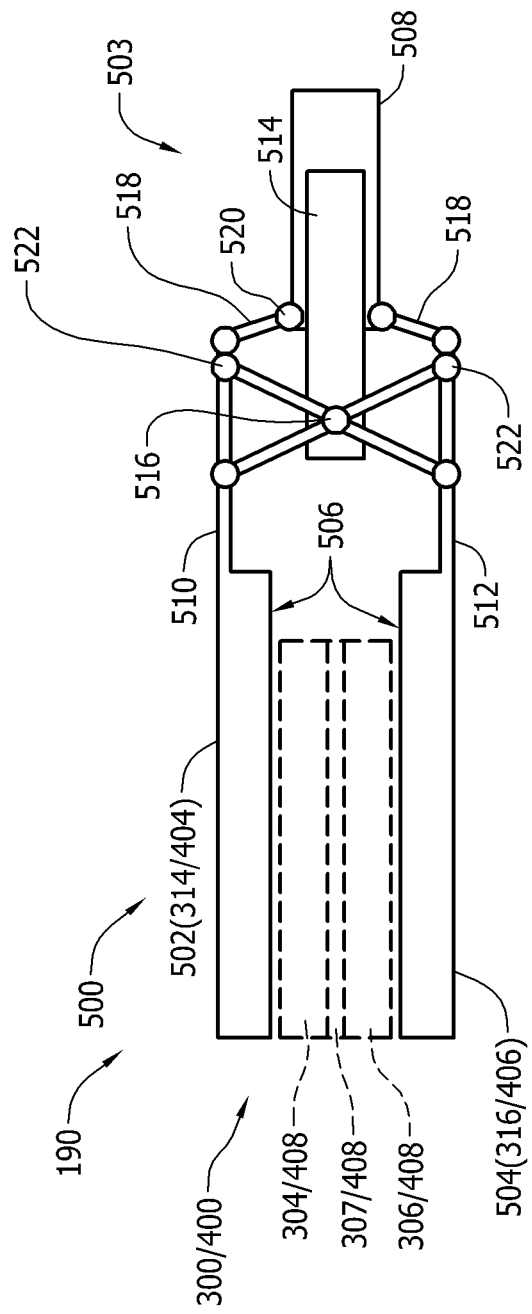
FIG. 21 is a schematic side view of the actuation jaw shown in FIG. 20 in an unclamped position.

FIG. 20 is a schematic side view of an exemplary actuation jaw assembly 500 in a clamp position 501 that may be used with keeper clamp shield device 300 and keeper clamp shield device 400. FIG. 21 is a schematic side view of actuation jaw assembly 500 in an unclamped position 503.

In the exemplary embodiment, actuation jaw assembly 500 includes a first jaw clamp 502 and a second jaw clamp 504 positioned opposite to first jaw clamp 502. In clamped position 501 of actuation jaw assembly 500, first jaw clamp 502 and second jaw clamp 504 do not touch keeper clamp shield device 300/400. Each of first jaw clamp 502 and second jaw clamp 504 define a plurality of contact faces 506, wherein faces 506 define a large surface area that facilitates unclamping keeper clamp shield devices 300 and 400. Actuation jaw assembly 500 further includes an enclosure body 508.

Also, in the exemplary embodiment, first jaw clamp 502 is one of first portion 314 of keeper clamp shield device 300 and first portion 404 of keeper clamp shield device 400. Further, in the exemplary embodiment, second jaw clamp 504 is one of second portion 316 of keeper clamp shield device 300 and second portion 406 of keeper clamp shield device 400.

Moreover, in the exemplary embodiment, actuation jaw assembly 500 includes a first member 510 coupled to first jaw clamp 502 and a second member 512 coupled to second jaw clamp 504. Further, in the exemplary embodiment, actuation jaw assembly 500 includes a pivot pin constraint 514 fixedly coupled to enclosure body 508. Pivot pin constraint 514 is also coupled to an actuating protrusion, e.g., an anchored pivot pin 516. Actuation jaw assembly 500 also includes a plurality of pivoting linkage members 518 coupled to a plurality of rotational linkage pivot pins 520 and linear linkage pins 522. Linear linkage pins 522 are also coupled to first member 510 and second member 512. At least some of rotational pivot linkage pins 520 are coupled to enclosure body 508. Also, at least some of rotational linkage pivot pins 520 are coupled to first member 510 and second member 512.

In operation with keeper clamp shield device 300, actuation jaw assembly 500 is in clamped position 501 and first jaw clamp 502 and second jaw clamp 504 do not touch keeper clamp shield device 300. First portion 314 and second portion 316 of shield 312 (shown in FIG. 12) are separated from each other and a magnetic field (not shown) induced by magnet 308 extends beyond shield 312, thereby facilitating coupling of device 300 to surface 322 (shown in FIG. 13) with device 300 in the "on" condition as shown in FIG. 12. Keeper clamp shield device 300 is magnetically coupled to magnetic surface 322, wherein magnetic surface 322 includes, without limitation, a surface of rotor blade airfoil portion 180 (shown in FIG. 2).

Also, in operation with keeper clamp shield device 300, actuation jaw assembly 500 is shifted from clamped position 501 to unclamped position 503 by inducing a force on anchored pivot pin 516, such induced force directed away from device 300. Pivot pin constraint 514 moves away from device 300 an pivoting linkage members 518 shift about rotational linkage pivot pins 520 to move first member 510 and second member 512. First jaw clamp 502 and second jaw clamp 504 are moved such that contact faces 506 couple to first portion 304 and second portion 306. Linear linkage pins 522 facilitate maintaining a horizontal alignment of first member 510 and second member 512. First member 510 and second member 512 move first portion 502/314 and second portion 504/316 of shield 312 together to contain a significant portion of the magnetic field induced by magnet 308, thereby shifting device 300 to the "off" position as shown in FIG. 13. Keeper clamp shield device 300 is no longer magnetically coupled to magnetic surface 322.

Alternatively, in operation with keeper clamp shield device 400 actuation jaw assembly 500 is in clamped position 501 and first jaw clamp 502 and second jaw clamp 504 do not touch keeper clamp shield device 400. First portion 404 and second portion 406 of shield 402 (all shown in FIG. 17-19) are separated from each other and a magnetic field 412 (shown in FIG. 19) induced by magnet 408 (shown in FIG. 17-19) extends beyond shield 402, thereby facilitating coupling of device 400 to surface 322 (shown in FIG. 13) with device 400 in the "on" condition as shown in FIGS. 17-19. Keeper clamp shield device 400 is magnetically coupled to magnetic surface 322, wherein magnetic surface 322 includes, without limitation, a surface of rotor blade airfoil portion 180 (shown in FIG. 2).

Also, in operation with keeper clamp shield device 400, actuation jaw assembly 500 is shifted from clamped position 501 to unclamped position 503 by inducing a force on anchored pivot pin 516, such induced force directed away from device 300. Pivot pin constraint 514 moves away from device 300 an pivoting linkage members 518 shift about rotational linkage pivot pins 520 to move first member 510 and second member 512. first member 510 and second member 512 are moved such that first portion 502/404 and second portion 504/406 control the gap 414. Linear linkage pins 522 facilitate maintaining a horizontal alignment of first member 510 and second member 512. First jaw clamp 502 and second jaw clamp 504 move first portion 404 and second portion 406 of shield 402 together to contain a significant portion of magnetic field 412 induced by magnet 408, thereby shifting device 400 to the "off" position as shown in FIGS. 14-16. Keeper clamp shield device 400 is no longer magnetically coupled to magnetic surface 322.

Figure 22:
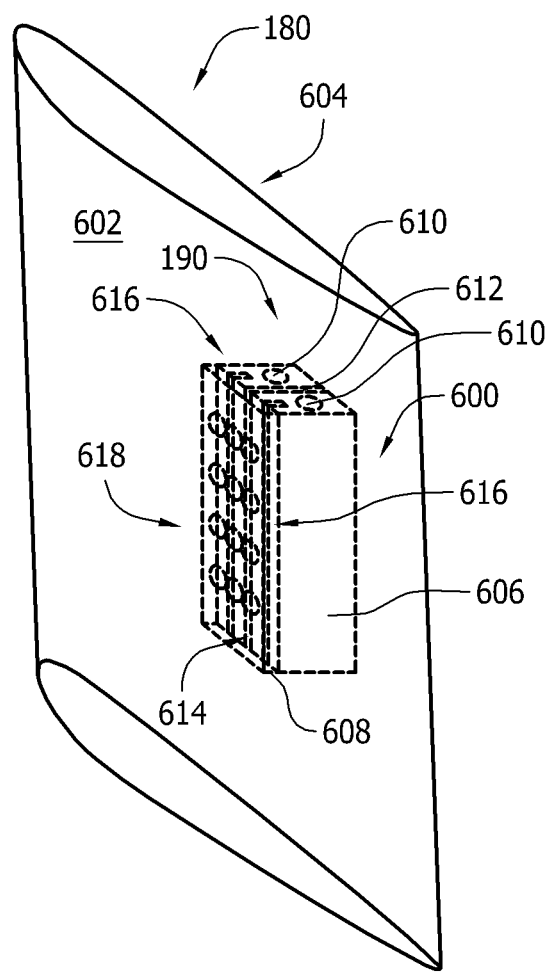
FIG. 22 is a perspective schematic view of an exemplary adhesive device prior to coupling that may be used with the turbine engine shown in FIG. 1.

FIG. 22 is a perspective schematic view of an exemplary adhesive device 600 that may be used with sensor assembly 190 and turbine engine 100 (shown on FIG. 1). While adhesive device 600 may be used with turbine engine 100 as described herein, adhesive device 600 may be used with any device with any rotary machine or any machine that includes regions and/or components that are difficult to visually observe during operation, and that includes any adhesive surface.

FIG. 22 shows adhesive device 600 prior to coupling to rotor blade airfoil portion 180 (shown in FIG. 2). Airfoil portion 180 includes a convex face 602 and an opposing concave face 604, and adhesive device 600 is positioned in the vicinity of concave face 604. In the exemplary embodiment, adhesive device 600 includes a casing 606.

Adhesive device 600 also includes a first insulation barrier 608 coupled to casing 606. Adhesive device 600 further includes a plurality of electric terminals 610 embedded within casing 606. In the exemplary embodiment electric terminals 610 are coupled to a direct current (DC) source (not shown). Alternatively, electric terminals 610 are coupled to an alternating current source. Adhesive device 600 also includes a second insulation barrier 612 positioned between electrodes 610 and coupled to casing 606. First and second insulation barriers 608 and 612 are formed from any nonconductive material and facilitate electrical isolation of adhesive device 600 and airfoil portion 180 and reducing a potential for electrical short circuits. Electric terminals 610 are coupled to at least one resistive heating device (not shown) that facilitates heating an adhesive to decrease its viscosity.

An adhesive cavity 614 is defined between casing 606 and first insulation barrier 608. A plurality of adhesive stick slots 616 are defined within casing 606 such that slots 616 are coupled in flow communication with adhesive cavity 614. A plurality of adhesive pores 618 are formed in second insulation barrier 612 that facilitate coupling adhesive cavity 614 with concave surface 604.

Figure 23:
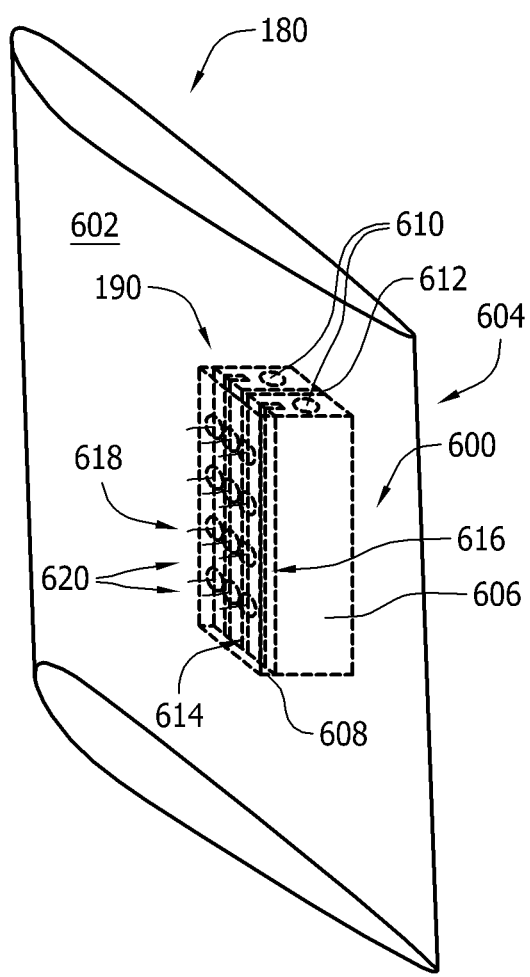
FIG. 23 is a perspective view of the adhesive device shown in FIG. 22 with hot adhesive.

FIG. 23 is a perspective view of adhesive device 600 with hot adhesive 620 being channeled from adhesive cavity 614 with concave surface 604. Alternatively, any shaped surface that enables operation of adhesive device 600 as described herein may be used. In operation, adhesive sticks (not shown) are inserted into adhesive stick slots 616. In the exemplary embodiment, a low-temperature, silicon-based adhesive is used. Alternatively, any adhesive that enables operation of adhesive device 600 as described herein is used. Actuation jaw assembly 250 (shown in FIGS. 8-10) is coupled to electric terminals 610 in open position 251 (shown in FIG. 8). Actuation jaw assembly 250 is operated as described above and assembly 250 shifts to actuation position 288 (shown in FIG. 10). Electric terminals 610 are coupled to a DC power source (not shown). Electric terminals 610 and the resistive heating device are energized, the adhesive sticks are melted, and hot adhesive 620 flows from adhesive stick slots 616 to surface 604 via adhesive cavity 614 and adhesive pores 618. Adhesive device 600 is positioned against surface 604 and hot adhesive 620 contacts surface 604. Once sufficient hot adhesive 620 is in contact with surface 604, electric terminals 610 are deenergized by shifting actuation jaw assembly 250 to open position 251 and hot adhesive 620 is naturally cooled.

Figure 24:
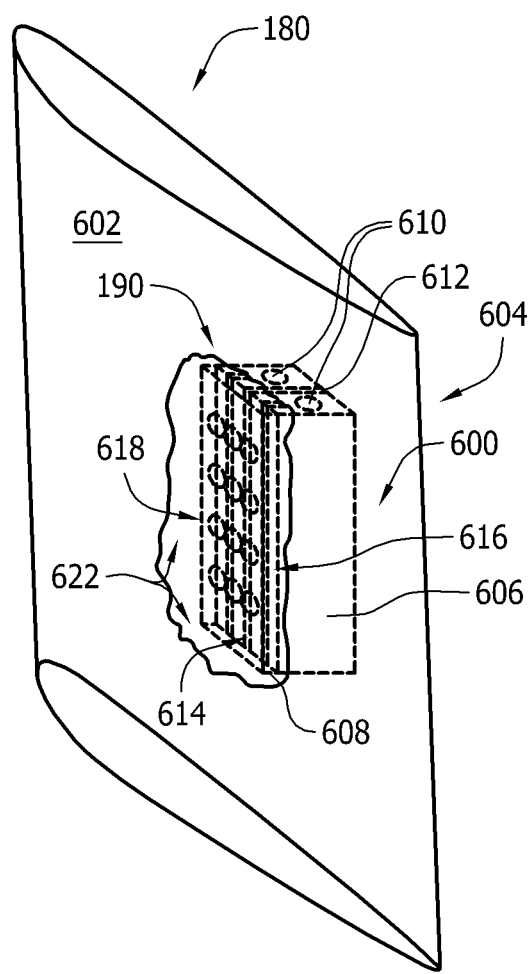
FIG. 24 is a perspective view of the adhesive device shown in FIG. 22 with cooled adhesive.

FIG. 24 is a perspective view of adhesive device 600 with cooled adhesive 622 and device 600 is coupled to surface 604. Adhesive device 600 is removed from surface 604 by reenergizing electric terminals 610 to reheat cooled adhesive 622 to hot adhesive 620 and device 600 is pulled from surface 604. Residual adhesive 620 and 622 is removed, if required, via any method that facilitates maintenance of the finish on airfoil 180.

Figure 25:
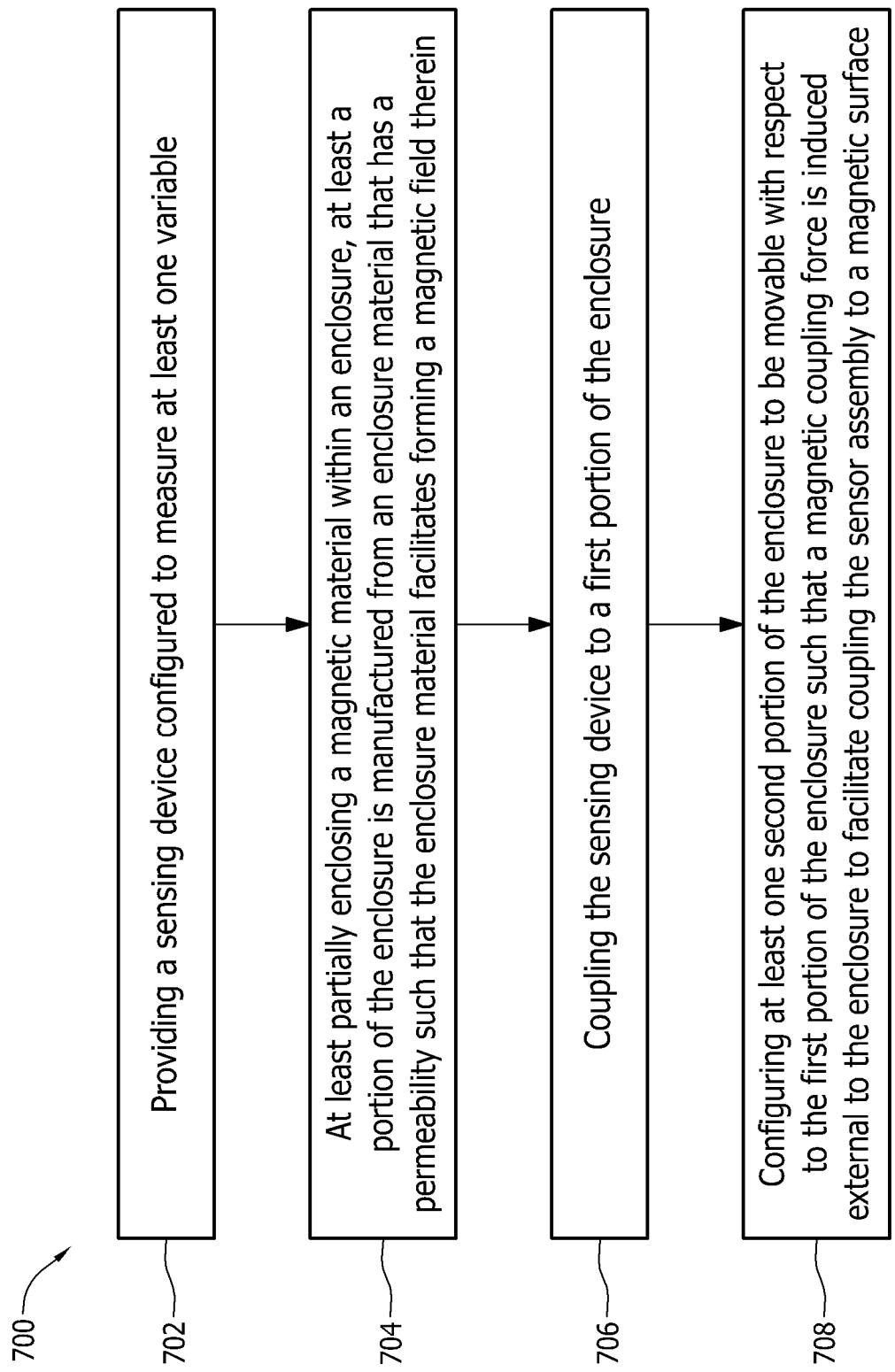
FIG. 25 is a flow chart illustrating an exemplary method of assembling a magnetic coupling device for a sensor assembly that may be used with the turbine engine shown in FIG. 1.

FIG. 25 is a flow chart illustrating an exemplary method 700 of assembling magnetic coupling devices 200, 300, and 400 (shown in FIGS. 3, 11, and 14, respectively) for sensor assembly 190 (shown in FIG. 2). In the exemplary embodiment, sensing device 191 (shown in FIG. 2) is provided 702. Sensing device 191 is configured to measure at least one variable. Magnets 208, 308, and 408 (shown in FIGS. 3, 11, and 14, respectively) are at least partially enclosed 704 within an enclosure, e.g., devices 200, 300, and 400 that each include at least a portion thereof, i.e., keeper 204 (shown in FIG. 3), shield 312 (shown in FIG. 11), and shield 402 (shown in FIG. 14) that is manufactured from an enclosure material that has a permeability such that the enclosure material facilitates forming a magnetic field 214 (shown in FIGS. 4 and 7) and 412 (shown in FIGS. 16 and 19) therein. Sensing device 191 is coupled 706 to a first portion, e.g., casing 202 (shown in FIG. 3), first portion 314 (shown in FIG. 11), and first portion 404 (shown in FIG. 14) of devices 200, 300, and 400, respectively. At least one second portion, e.g., keeper 204, second portion 316 (shown in FIG. 11), and second portion 406 (shown in FIG. 14) of devices 200, 300, and 400, respectively are configured 708 to be movable with respect to casing 202, first portion 314, and first portion 404 such that a magnetic coupling force is induced external to devices 200, 300, and 400, respectively, to facilitate coupling sensor assembly 190 to a magnetic surface, e.g., rotor blade airfoil portion 180 (shown in FIG. 2).

Embodiments of sensor assemblies as provided herein facilitate visual inspection of turbine engines, including gas turbines and steam turbines. Such sensor assemblies are coupled to rotatable portions of the turbine engine, for example, compressor blades. The compressor blades are rotated past the stationary blades and visual sensing devices capture visual inspection data for the stationary blades. These sensing devices facilitate inspections of stationary blades without disassembly and removal of the rotating blades. Elimination of such additional disassembly decreases costs of the inspections, decreases a time that the turbine engine is removed from service, and decreases reliance on specialized equipment and personnel skills, thereby further reducing costs of inspection.

Described herein are exemplary embodiments of sensor assemblies that facilitate inspections of turbine engines. Specifically, use of the sensor assemblies as described herein facilitates inspections of those components that are difficult to gain access. Also, specifically, coupling such sensor assemblies to rotatable portions of the turbine engines, for example, the rotatable compressor blades, and rotating those blades past the stationary blades reduces disassembly and removal of the rotating blades to gain access to the stationary blades. Coupling visual sensing and recording devices facilitates capture of the visual inspection data for immediate or future review. Elimination of such additional disassembly decreases costs of the inspections, decreases a time that the turbine engine is removed from service, and decreases reliance on specialized equipment and personnel skills, thereby further reducing costs of inspection.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A sensor assembly comprising:
a sensing device configured to measure at least one variable; and
at least one magnetic coupling device, said at least one magnetic coupling device comprising:
at least one magnet; and
an enclosure at least partially manufactured from a material that has a permeability that facilitates forming and retaining a magnetic field therein and substantially preclude inducement of a magnetic field extending externally to said enclosure, said enclosure comprising:
a first portion coupled to said at least one magnet; and
at least one second portion movable with respect to said first portion to expose said at least one magnet such that a magnetic coupling force is induced external to said enclosure to facilitate coupling the sensor assembly to a surface.

2. A sensor assembly in accordance with claim 1, wherein said sensing device comprises a visual sensing device configured to transmit video signals to at least one of a monitoring device and a video recording device.

3. A sensor assembly in accordance with claim 1, wherein the at least one variable is a visually observable condition.

4. A sensor assembly in accordance with claim 1, wherein said at least one magnetic coupling device is configured to magnetically couple said sensor assembly to a rotatable portion of a turbomachine.

5. A sensor assembly in accordance with claim 1, wherein said at least one magnetic coupling device comprises one of Halbach array magnets and alternating-polarity magnets.

6. A sensor assembly in accordance with claim 1, wherein said at least one second portion comprises a movable shielding device comprising at least one material that facilitates forming and retaining magnetic fields therein and substantially preclude inducement of a magnetic field extending externally to said movable shielding device.

7. A sensor assembly in accordance with claim 6 further comprising an actuation device coupled to said movable shielding device, said actuation device comprises:
at least one linkage member coupled to an actuating protrusion; and
at least one biasing device coupled to said at least one linkage member.

8. A sensor assembly coupled in accordance with claim 7, wherein said actuation device and said movable shielding device comprise a longitudinally translatable linear keeper that substantially precludes inducement of a magnetic field extending externally to said enclosure.

9. A sensor assembly in accordance with claim 6 further comprising an actuation device coupled to said movable shielding device, said actuation device comprises at least one linkage member coupled to an actuating protrusion.

10. A sensor assembly comprising:
a sensing device configured to measure at least one variable; and
at least one magnetic coupling device, said at least one magnetic coupling device comprising:
at least one magnet; and
an enclosure at least partially manufactured from a material that has a permeability that is to enable formation and retention of a magnetic field therein and substantially preclude inducement of a magnetic field extending externally to said enclosure, said enclosure comprising:
a first portion coupled to said at least one magnet; and
at least one second portion movable with respect to said first portion such that a magnetic coupling force is induced external to said enclosure to facilitate coupling the sensor assembling to a surface;
wherein said at least one magnetic coupling device includes a movable shielding device substantially fabricated from at least one material having a magnetic permeability to enable formation and retention of a magnetic field therein and substantially preclude inducement of a magnetic field extending externally of said movable shielding device; and
an actuation device coupled to said movable shielding device, wherein said actuation device includes at least one linkage member coupled to an actuating protrusion;
wherein said actuation device and said movable shielding device comprise a laterally translatable split-shield keeper that substantially precludes inducement of a magnetic field extending externally to said enclosure.

* * * * *